US007002922B1

(12) United States Patent
Shigenari et al.

(10) Patent No.: US 7,002,922 B1
(45) Date of Patent: Feb. 21, 2006

(54) COMMUNICATION NETWORK SPECIFIC CHARGING METHOD AND COMMUNICATION NETWORK SPECIFIC CHARGING APPARATUS

(75) Inventors: Masanobu Shigenari, Kanagawa (JP); Sachiko Matsui, Tokyo (JP); Ekuo Sato, Tokyo (JP); Tsuyoshi Yamamoto, Kanagawa (JP); Makoto Ozawa, Chiba (JP); Kimi Mizuno, Tokyo (JP); Yasuhiko Matunaga, Tokyo (JP); Keisuke Tanaka, Kanagawa (JP)

(73) Assignees: Sony Corporation, Tokyo (JP); NTT Communications Corporation, Tokyo (JP)

( * ) Notice: Subject to any disclaimer, the term of this patent is extended or adjusted under 35 U.S.C. 154(b) by 0 days.

(21) Appl. No.: 09/536,052

(22) Filed: Mar. 27, 2000

(30) Foreign Application Priority Data

Mar. 31, 1999 (JP) ............................... P11-090953

(51) Int. Cl.
*G01R 31/08* (2006.01)

(52) U.S. Cl. ................................. 370/253; 379/114.03

(58) Field of Classification Search ................ 379/111, 379/112.07, 114.01, 114.06, 114.07, 114.08, 379/114.09, 114.1, 114.12; 370/395.1, 389, 370/395.2, 395.21, 395.41, 395.42, 395.43, 370/395.5, 395.52, 253; 709/111, 112.07, 709/114.01, 114.06, 114.07, 114.08, 114.09, 709/114.4, 114.12

See application file for complete search history.

(56) References Cited

U.S. PATENT DOCUMENTS

| | | | | |
|---|---|---|---|---|
| 6,011,778 | A * | 1/2000 | Kilkki et al. | 370/232 |
| 6,338,046 | B1 * | 1/2002 | Saari et al. | 705/34 |
| 6,363,053 | B1 * | 3/2002 | Schuster et al. | 370/230 |

FOREIGN PATENT DOCUMENTS

| | | |
|---|---|---|
| EP | 0 837 578 | 4/1998 |
| EP | 0837578 | 4/1998 |
| GB | 2344966 | 6/2000 |
| WO | WO 97/34762 | 10/1997 |
| WO | WO 97/37462 | 10/1997 |

* cited by examiner

*Primary Examiner*—Duc Ho
*Assistant Examiner*—Thien Tran
(74) *Attorney, Agent, or Firm*—Sonnenschein, Nath & Rosenthal LLP

(57) ABSTRACT

To charge surely depending on data transmitted through a TCP/IP communication network or the like with a simple configuration. In charging method for data transmission in a communication network in which a plurality of positions are connected to each other through a wide area network, sub-networks being connected to the respective positions through LANs, and sending of data from terminal stations in the sub-networks or receiving of data in the terminal stations being performed, sampling measurements of transmission states of originated data in the LANs and transmission states of incoming data in the LANs are performed in the LANS connected to respective positions, the data of the transmission states subjected to the sampling measurement being periodically transmitted to a predetermined center connected to the communication network, and an amount of charging to each sub-network being decided on the basis of the data of the transmission states transmitted to the center.

6 Claims, 7 Drawing Sheets

FIG. 6

| IP Address | Sub-Net Mask | The Number of Significant Bits | Branch | Region | Charging Priority Code |
|---|---|---|---|---|---|
| 10.1.1.10 | 255.255.255.255 | 32 | Branch D (Code11) | Japan | 1 |
| 10.3.1.x | 255.255.255.0 | 24 | Branch C (Code12) | Japan | 0 |
| 10.1.1.x | 255.255.255.0 | 24 | Branch A (Code13) | Japan | 2 |
| 10.2.x.x | 255.255.0.0 | 16 | Branch B (Code14) | Asia | 0 |
| 10.126.x.x | 255.255.0.0 | 16 | Branch E (Code15) | U.S.A | 0 |
| | | | | | |

Where x an is integer ranging from 1to 255

FIG. 8

| Application | Beneficiary | Protocol |
|---|---|---|
| E-MAIL | Sender | smtp |
| | | pop |
| WWW | Receiver | http |
| | | TPC10080 |
| FTP | Receiver | ftp |
| | | ftp-data |

COMMUNICATION NETWORK SPECIFIC CHARGING METHOD AND COMMUNICATION NETWORK SPECIFIC CHARGING APPARATUS

BACKGROUND OF THE INVENTION

1. Field of the Invention

The present invention relates to a communication network specific charging method and a communication network specific charging apparatus which are preferably applied to a TCP/IP (Transmission Control Protocol/Internet Protocol) communication network formed among a plurality of branches.

2. Description of the Related Art

In an enterprise having a plurality of branches, the branches are connected to each other through a large-scale TCP/IP communication network for data communication, so that data communication can be made possible between terminal devices installed in the respective branches. As a function executed by data communication, e.g., data transfer of text data or image data between, the terminal devices, transmission and reception of electronic mails, web browsing of the Internet, and the like are known.

In such a TCP/IP communication network, an enterprise or the like which opens the network generally pays the expenses of operating the network. Therefore, a fee for use of lines of every data communication (so-called speech communication fee or connection fee) is not required, as in a case where connection to an internet provider or a mail server is performed using an ordinary public telephone line is used, and such a system configuration that charging is performed for every data communication is not established. More specifically, a system configuration is so that, when the ordinary public telephone line is used, an originating state from each subscriber is monitored on an exchange station side, and when the originating occurs, charging is performed according to the time of speech communication and a distance at that time. In case of a network for TCP/IP communication in a conventional limited area such as an enterprise, such a system for charging is not necessary.

However, in recent years, the application of data communication using the TCP/IP communication network of this type is widened, and an amount of data transmission tends to increase. The area where connection is made through the network is not within one enterprise, but the area tends to be wider, as connection between related companies and so on. Therefore, a line having a large capacity must be assured as a communication line for assuring a necessary amount of data transmission, and a very large number of communication lines themselves are required. Specifically, a communication line for connecting positions to each other must be replaced with a communication line of a large capacity, or the number of positions themselves connected through a communication line must be increased. Costs for the operation of a TCP/IP communication network are thus increasing.

Here, when an area where connection is performed through a TCP/IP communication network is limited to, e.g., a relatively small area of, one enterprise, the enterprise which operates the TCP/IP communication network pays all the costs of operating the TCP/IP communication network without any problem. However, when a network is established between related companies, amounts to be paid by the respective companies of the costs of operating the TCP/IP communication network will be a problem. In the past, amount or rates which are paid by the respective companies are prescribed in advance, and the companies pay the prescribed amounts regardless of actual amounts of data communication. However, data transmission states of the branches connected through the network are different from each other. It is unfair that a branch which frequently exchanges data through the network and a branch which experiences a small amount of data transmission pay the costs of operating the network at equal rates.

In order to solve the problem, for example, the following system may be conceived. That is, data transmitted through the network is always monitored, and charging is performed in the same way, as in a public telephone line, each time data transmission is detected by the monitoring. However, when the system for always monitoring all data transmissions is added to the TCP/IP communication network, the configuration for monitoring the data transmissions will be complicated, and the data of a transmission state detected by the monitoring system must be transmitted to a center for performing charging processing through the TCP/IP communication network. Thus, the consideration high ratio of data transmitted through the TCP/IP communication network will be charging data, so that the efficiency of data transmission itself is degraded.

For example, in a conventional system, when connecting through a wide area network positions to which local area networks being networks in small areas of branches, etc. are connected to constitute a TCP/IP communication network, the traffic of data transmitted through the wide area network is measured and data related to the measured traffic could be collected at a center connected to a predetermined position of the TCP/IP communication network. However, in such a system configuration, a considerably large amount of data transmitted through the wide area network is occupied by the data related to the measured traffic. When such a matter arises, the transmission capacity of the communication line forming a TCP/IP communication network must inappropriately be increased for a charging processing.

Moreover, in a communication line for a wide area network connecting positions to each other, depending on a data transmission capacity required at that time, the type of a communication line to be used must be selected and communication lines having various capacities are used. Also, as a device for measuring the traffic, a device corresponding to the type of the communication line must be also prepared. When the transmission capacity of a communication line is changed, the device for measuring a traffic must be changed into a device corresponding to the transmission capacity. Each time the system configuration of the TCP/IP-communication network changes, the charging system must be updated.

Furthermore, the conventional traffic measurement device can be measure a traffic such as an amount of transmission of data transmitted through the network can be measured, but cannot determine the type of the transmitted data, so that appropriate charging depending on the type of the transmitted data cannot be performed. More specifically, when fair charging to a beneficiary of the transmitted data is considered, the sending side is preferably charged for the data of an electronic mail, and, for web browsing of the Internet, the receiving side which conducts the web browsing is preferably charged. When the conventional traffic measurement device is used, such charging depending on the type of data cannot be performed.

It is an object of the present invention to reliably perform charging depending on data transmitted through a communication network of this type with a simple configuration.

SUMMARY OF THE INVENTION

According to the present invention, there is provided a communication network specific charging method for data transmission in a communication network in which a plurality of positions are connected to each other through a wide area network, sub-networks being connected to the respective positions through local area networks, and sending of data from terminal stations in the sub-networks or receiving of data in the terminal stations being performed, comprising the steps of: performing sampling measurements in the local area networks connected to the respective positions, of transmission states of data sent from the local area networks and transmission states of incoming data received in the local area networks; periodically transmitting data of the transmission states subjected to the sampling measurement to a predetermined center connected to the communication network; and deciding an amount of money to be charged to each user of a sub-network on the basis of the data of the transmission states collected in the center. An existing communication network measurement apparatus can be used herein as an apparatus for performing sampling measurement of the transmission state of data send and received in the local area network.

According to the communication network specific charging method, the transmission state of data is decided by the sampling measurement on the local area network side to enable charging processing for charging.

According to the present invention, there is provided a communication network specific charging apparatus for processing to charge for data transmission in a communication network in which a plurality of positions are connected to each other through a wide area network, sub-networks being connected to the respective positions through local area networks, and sending of data from terminal stations in the sub-networks or receiving of data in the terminal stations being performed, comprising: receiving means which is connected to a predetermined position of the communication network and receives sampled traffic data collected from traffic measurement means connected to the local area networks at the respective positions; and charging processing means which decides a data transmission state in the communication network on the basis of the traffic sampling data received by the receiving means and generates charging data for performing charging to users of the respective sub-networks on the sending side or the receiving side of the data on the basis of the decided transmission state.

According to the communication network specific charging apparatus, on the basis of the sampled traffic data transmitted from the traffic measurement means connected to the communication network, data transmission states in the sub-networks are decided to enable charging to the users of the respective sub-networks.

BRIEF DESCRIPTION OF THE DRAWINGS

FIG. 6 is a table showing the correspondences between IP addresses and branches according to an embodiment of the present invention;

FIG. 8 is a table showing a charging policy according to an embodiment of the present invention.

DESCRIPTION OF THE PREFERRED EMBODIMENTS

An embodiment of the present invention will be described below with reference to the accompanying drawings.

Figure 1:
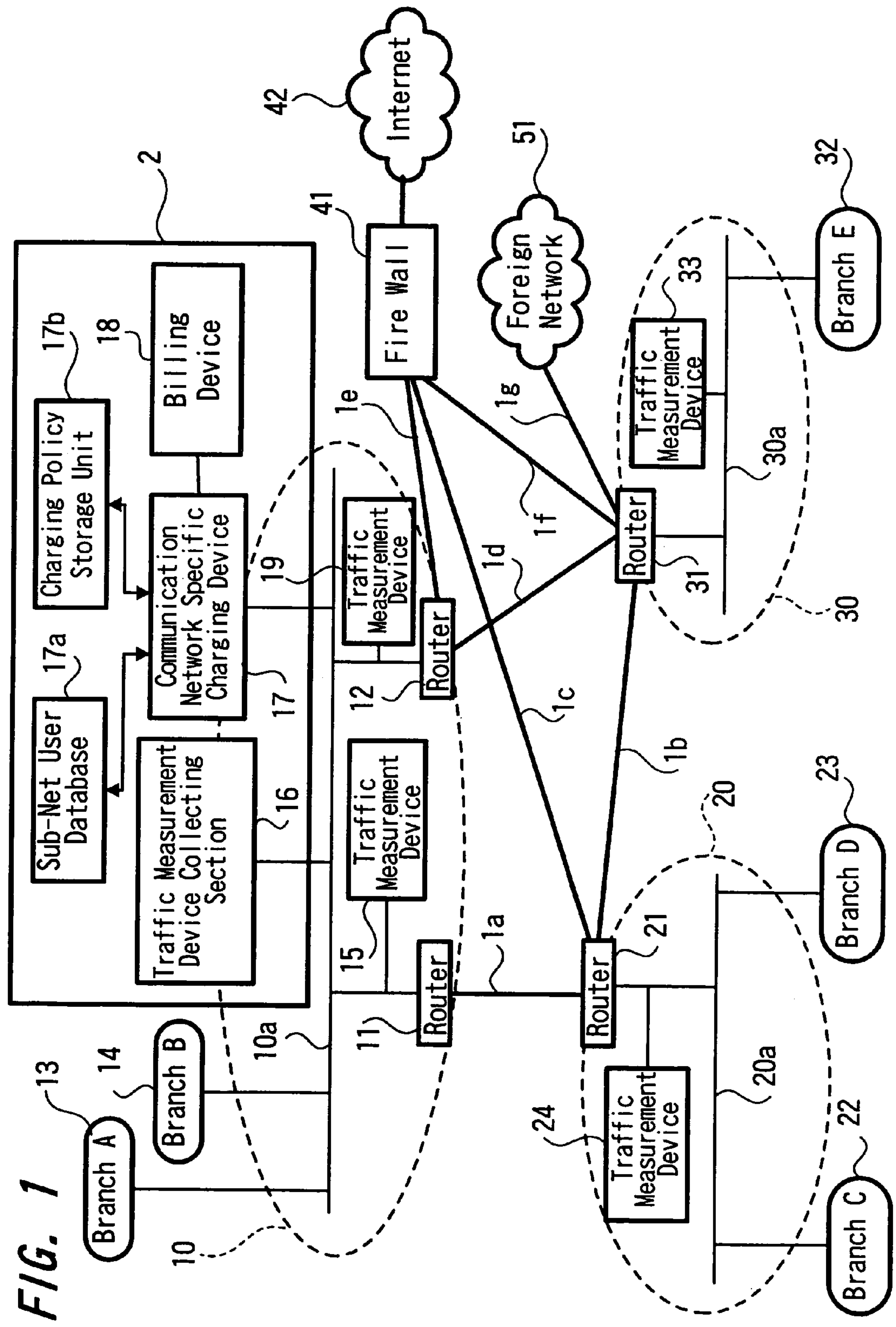
FIG. 1 is a diagram showing a system configuration according to an embodiment of the present invention.

FIG. 1 is a diagram showing a configuration of a communication network according to this embodiment. In FIG. 1, a TCP/IP communication network is used as a communication network. The configuration of the communication network will be described first. In this embodiment, LAN segments 10, 20, and 30 each having a local area network (hereinafter referred to as a LAN) are arranged at respective positions. One router or a plurality of routers 11, 12, 21, and 31 are connected to LANs 10*a*, 20*a*, and 30*a* being communication lines forming LANs in the respective LAN segments. These routers are connected to each other through communication lines (hereinafter referred to as WAN lines) 1*a*, 1*b*, 1*c*, . . . , 1*g* forming a wide area network. Each router selects a line suitable for a destination address of transmission data is selected on the basis of preset route information, and transmits data to the line.

In this case, the two routers 11 and 12 are connected to the LAN 10*a* in the LAN segment 10, and the other WAN lines 1*a*, 1*d*, and 1*e* are connected to the routers 11 and 12, respectively. A sub-network 13 in branch A and a sub-network 14 in branch B are connected to the LAN 10*a* in the LAN segment 10, and a plurality of communication terminal stations (personal computer devices or the like) are connected to the respective sub-networks. Traffic measurement devices 15 and 19 are connected to the LAN 10*a* to measure the traffic of originated and arriving data in terminal stations connected to the LAN 10*a*.

Similarly, the router 21 connected to the communication lines 1*a*, 1*b* and 1*c* is also arranged in the LAN 20*a* in the LAN segment 20. A sub-network 22 in branch C and a sub-network 23 in branch D are connected to the LAN 20*a*. A plurality of communication terminal stations are connected to the sub-networks, respectively. A traffic measurement device 24 is also connected to the LAN 20*a* to measure originated and arriving data in the terminal stations connected to the LAN 20*a*.

A router 31 connected to WAN lines 1*b*, 1*d*, 1*f* and 1*g* is also arranged in the LAN 30*a* in the LAN segment 30, and a sub-network 32 in branch E is connected to the LAN 30*a*. A plurality of communication terminal stations are connected to this sub-network. A traffic measurement device 33 is also connected to the LAN 30*a* to measure originated and arriving data in the terminal stations connected to the LAN 30*a*.

The network configuration of this embodiment is connected to an internet 42 through a fire wall 41 connected to the predetermined WAN lines 1*c*, 1*e* and 1*f*. The communication line 1*g* connected to a foreign network 51 is connected to the router 31 at the predetermined position. In data transmission in the network according to this embodiment, an international standard protocol called TCP/IP (Transmission Control Protocol/Internet Protocol) is used as a communication protocol, and the sender and destination are specified by IP (Internet Protocol) addresses.

The traffic measurement devices 15, 24, and 33 prepared herein in each LAN segments 10, 20, and 30 are called LAN probes. In this configuration, data directed to the terminal station in the LAN as the sender or the destination is measured by sampling. As a traffic measurement device that performs such a sampling measurement, for example, a product called "NetMetrix" (trade name) made by Hewlett-Packard corporation is known.

In other words, originating and arriving of all data in the LANs are not measured, but only is a part of data transmission is measured on the basis of a predetermined condition. However, the traffic measurement device continuously operates for 24 hours everyday and performs the sampling measurement at any time during the 24-hour operation. In measurement related to the data transmission in this case, at least an IP address on the sending side, an IP address on the receiving side, an amount of data transmission, and the type of transmitted data herein are detected, and the detected data are stored in the traffic measurement device as traffic data. The types of transmitted data herein are the types of a protocol number and a port number. For example, when transmitted data is electronic mail data, it is detected which type of protocol (smtp, pop3, etc.) and which number of port numbers the communication uses.

An example is as follows.

| protocol number | port number |
|---|---|
| netstat | 15 |
| ftp | 21 |
| telnet | 23 |
| smtp | 25 |
| time | 37 |
| whois | 43 |
| domain | 53 |
| . . . | . . . |

Traffic data stored in the traffic measurement devices 15, 24, and 33 are periodically transmitted to a traffic measurement device (collecting section) 16 (described below through the TCP/IP communication network. Transmission of traffic data subjected to the sampling measurement from the traffic measurement device 16 to a TCP/IP communication network specific charging device 17 is periodically performed in a predetermined cycle. The cycle in which the traffic data is transmitted may be a relatively short cycle such as 15 minutes or 30 minutes. Alternatively, the traffic data may be transmitted once a day at night. The periodical transmission of the traffic data may be performed by a configuration in which the transmission is automatically executed by a timer or the like set in the traffic measurement device (collecting section) 16. In addition thereto, such a configuration may be adopted that the traffic data is sequentially transmitted from the traffic measurement device (collecting section) 16 by request from the TCP/IP communication network specific charging device 17.

In the LAN segment 10, a center 2 for performing a charging processing of the TCP/IP communication network is prepared, and a device for performing the charging processing is provided in the center 2. Specifically, the traffic measurement device 16 and the TCP/IP communication network specific charging device 17 are connected to the LAN 10*a* in the LAN segment 10. In the traffic measurement device (collecting section) 16, the traffic data transmitted from the traffic measurement devices 15, 19, 24 and 33 in the communication network are temporarily collected, and totalized. The resultant data are transmitted to the TCP/IP communication network specific charging device 17. A sub-net user data base 17*a* and a charging policy storage unit 17*b* are connected to the TCP/IP communication network specific charging device 17 to perform the processing of generating charging data by using the respective stored data. A billing device 18 is connected to the TCP/IP communication network specific charging device 17, and, on the basis of the generated charging data, the billing device 18 issues a bill of an amount of money charged to each branch.

In the network system of this embodiment, on the basis of traffic data measured by the traffic measurement device of each LAN segment, the traffic measurement device (collecting section) 16, the TCP/IP communication network specific charging device 17 and the billing device 18 execute the charging processing for data transmission, which will be described next.

Figure 2:
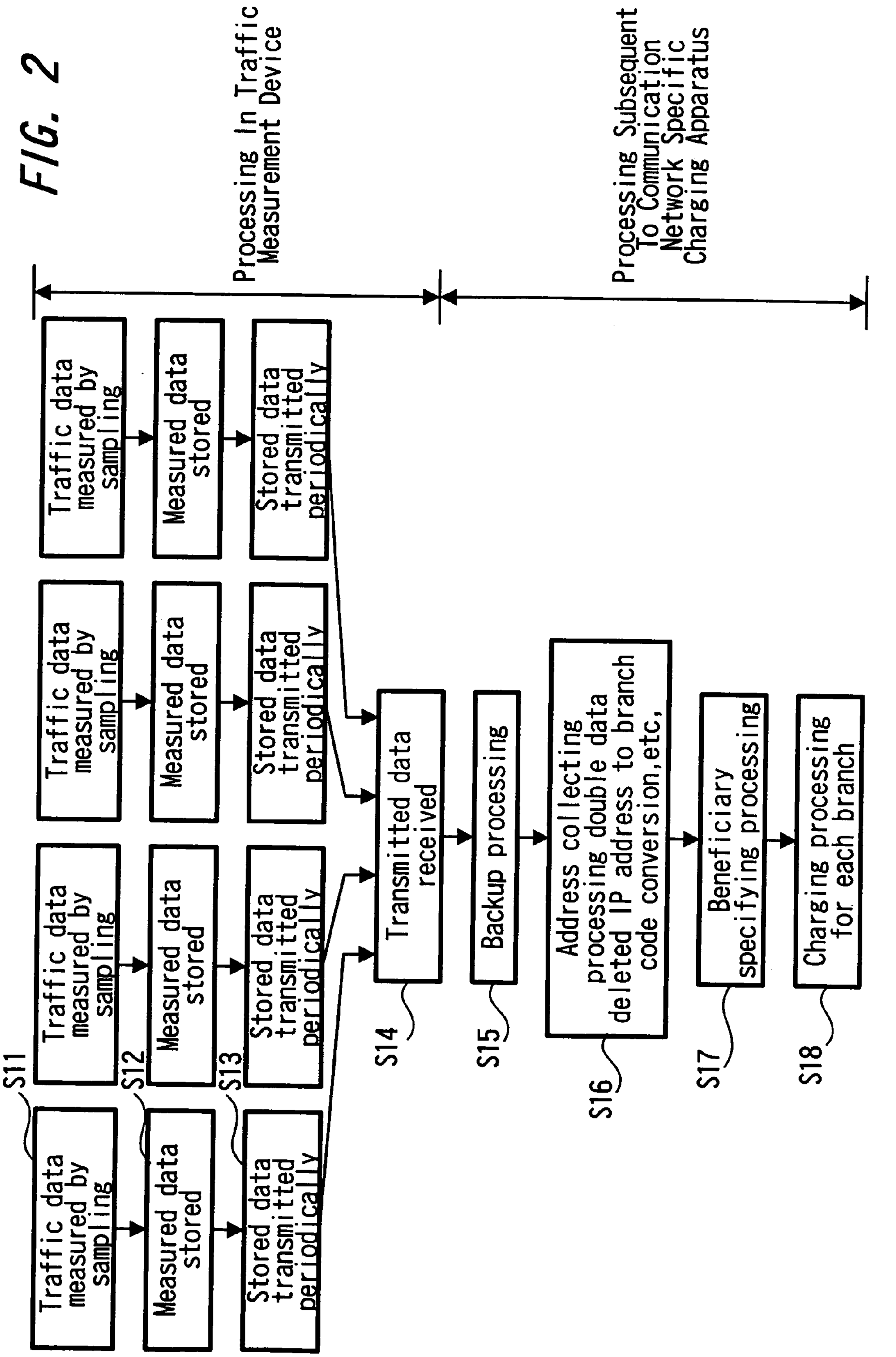
FIG. 2 is a flow chart showing a charging processing state according to an embodiment of the present invention.

The entire flow of the charging processing will be described first below with reference to a flow chart in FIG. 2. The traffic measurement devices 15, 19, 24 and 33 in the LAN segments 10, 20 and 30 perform traffic measurements by sampling independently (step S11). Traffics to be measured include at least IP addresses on the sending side and the receiving side, an amount of transmission data, and data on a data type, as described above. The measured traffic data are independently stored in the traffic measurement devices (step S12). The traffic data stored in the traffic measurement devices are periodically transmitted to the traffic measurement device (collecting section) 16 connected to the network (step S13). The traffic measurement device 16 receives the traffic data stored in the respective traffic measurement devices (step S14).

The TCP/IP communication network specific charging device 17 performs a backup processing for storing traffic data supplied from the traffic measurement device 16 (step S15), and then performs the collecting processing of an originator address and a destination address represented by traffic data(step S16). In the collecting processing performed here, when a plurality of identical transmission data exist, any one of the identical transmission data is deleted, and the processing to decide the code of a branch to be charged is performed based on the originator address and the destination address represented by the IP address. The processing to decide a branch from the IP address uses a sub-net mask stored in a sub-net user data base 17*a* (see FIG. 1) prepared for the TCP/IP communication network specific charging device 17. The details of the processing using the sub-net mask will be described below.

As to deletion of overlapping data, the traffic measurement device of this embodiment has a redundant configuration for preventing an impossible measurement due to a failure or the like of the traffic measurement device. For this reason, traffics are measured at a plurality of points so that one of transmission data is employed and the other transmission data are deleted. This is done because traffic data measured at two positions of the traffic measurement device 15 and the traffic measurement device 24 exist, for example, when data transmission from the LAN segment 10 to the LAN segment 20 is performed. Although any one of the data measured by the traffic measurement device 15 and the data measured by the traffic measurement 24 may be employed, both the data are not completely identical to each other because the measurement herein is the sampling measurement. Therefore, out of measurement data records, a record having the largest amount of transmission data of the same time zone, the same originator, the same destination, and the same protocol is taken, and the other records are deleted. However, when only traffic data output from one traffic measurement device is obtained for any reason, the obtained traffic data is used for the charging processing without performing deletion concerning data transmission of the route.

The processing to specify which branches are beneficiaries of respective data transmissions represented by the traffic data collected in step S16 is performed (step S17), and the processing to charge the specified beneficiaries branches) is performed. Charged amounts of the respective branches are calculated by the TCP/IP communication network specific charging device 17, and bills based on the calculated amounts are made by the billing device 18 at intervals of predetermined period such as one month (step S18). Since traffic data supplied to the TCP/IP communication network specific charging device 17 is traffic data measured by sampling, the original traffic state is restored (estimated) in the collecting process to perform the charging processing based on the restored traffic state.

Figure 3:
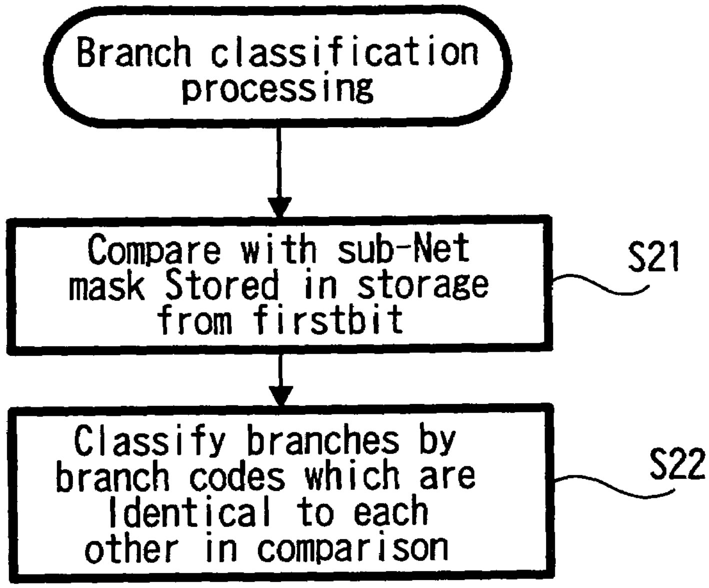
FIG. 3 is a flow chart showing a branch classification processing according to an embodiment of the present invention.

The TCP/IP communication network specific charging device 17 processes first to classify which branches are originators or destinations. The flow chart in FIG. 3 shows the classification processing. This classification processing classifies the IP addresses of the originator and destination on the basis of a sub-net user data stored in the sub-net user data base 17*a*.

More specifically, stored data in the sub-net user data base 17*a* prepared in the TCP/IP communication network specific charging device 17 are compared with each other from the first bit (step S21). When some data are identical to each other, data transmissions that are objects then are classified into codes of branches corresponding to the identical stored data (step S22).

Figure 4:
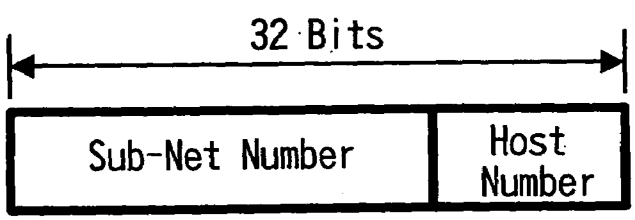
FIG. 4 is a diagram showing a structure of an IP address according to an embodiment of the present invention.
Figure 5:
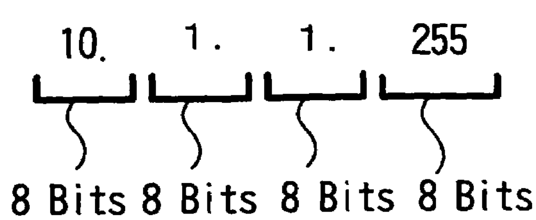
FIG. 5 is a diagram showing a description of an IP address according to an embodiment of the present invention.

In this context, details of the processing to specify a branch on the basis of an IP address using the stored data of the sub-net user data base 17*a* will be described below. First of all, the IP address used in the network will be described. As shown in FIG. 4, the IP address has a 32-bit structure and predetermined bits from the first bit in the 32 bits represent a sub-net number, and the sub-net number is an address given to a sub-network of each branch. The remaining bits represent an address given to each terminal station in the branch. An example of a description of the IP address is shown in FIG. 5, in which the IP address is described by numbers divided into 4 items each having 8 bits. The number of each of the 4 items is indicated by the number(s) ranging from 0 to 255 expressed by 8 bits.

In case of the system of this embodiment, the number until which the sub-net number is represented can be seen by referring to sub-net masks stored in the sub-net user data base 17*a*. Specifically, the data of sub-net numbers which are the numbers of all the sub-networks connected to the LANs in the network of this embodiment are stored in the sub-net user data base 17*a*. FIG. 6 shows an example of sub-net masks stored in the sub-net user data base 17*a*, which shows the ranges of IP addresses corresponding to the sub-net numbers represented by the sub-net masks as well as branches represented by the sub-net numbers. Regions indicating the regions of the branches and the data of charging priority codes set for the respective branches are stored in the sub-net user data base 17*a*. In this case, the regions are classified into Japan, an Asian country except for Japan, the U.S.A., and so on. The charging priority codes are codes given on the basis of priorities for charging the branches. As the charging priority codes in this embodiment, three kinds of codes, i.e., codes 0, 1, and 2 are set. A charging priority code 0 is set for a branch which is not charged; a charging priority code 1 is set for a branch which is charged depending on conditions; and a charging priority code 2 is set for the other branch. A charging priority code 0 is set herein for a branch established in a foreign country except for Japan, so that a branch in a foreign country may not be charged. As to domestic branches, a charging priority code is selected from the three kinds of codes 0, 1 and 2 to be set for each branch.

Describing the example shown in FIG. 6, [10. 1. 1. X] is set as an IP address corresponding to a sub-network in branch A, a portions represented by X is an area of a host number, in which area integers which range from 1 to 255 are allowed. The area of the sub-net number in the IP address is indicated a sub-net mask. The number of significant bits required to discriminate sub-net number is herein 24 bits starting from the first bit. In branch A, if the first item from the start is [10], the second item being [1], and the third item being [1] or [2], then the IP address is detected as that of branch A, and the corresponding data transmission is classified into code 13 associated with branch A.

As an IP address corresponding to a sub-network in branch B, [10. 2. X. X] is set. A portion represented by X is an area of a host number. Thus, when the first item from the start is [10], and the second item is [2], the IP address is detected as the IP address of branch B, the corresponding data transmission is classified into the code of branch B. Likewise, the IP addresses of other branches in the network can also be classified by the information of the sub-net masks.

As described above, the portions of sub-net numbers in the IP addresses are different from each other. However, a sub-network in a branch to which an address belongs can be decided with reference to the data which is prepared in the sub-net user data base 17*a*, so that a branch to be charged can be decided.

Details of the processing to specify a beneficiary at step S17 of the flow chart in FIG. 2 will be described next. In this embodiment, the processing is performed in such a manner that the types of respective data transmissions represented by collected traffic data are decided. More specifically, as shown in the flow chart in FIG. 7, charging priority codes of a sending branch and a receiving branch are decided with reference to charging priority codes of the branches stored in the sub-net user data base 17*a*, the charging priority of the sending branch side and the charging priority of the receiving branch side being compared with each other to check whether they are identical to each other or not (step S31). If the values of the charging priority codes of both branches are not identical to each other in this comparison, the branch having the code of greater value is charged (step S33). If the values of the charging priority codes of both branches are identical to each other by decision at step S31, it is checked whether the values of the charging priority codes of both branches are 0 or not (step S32). At this moment, if the values of charging priority codes of both branches are 0, both branches are not charged (step S35). In addition, if the values of charging priority codes of both branches are 1 or 2, a beneficiary decided according to an application to charging policy table is charged (step S34).

Data of the application to charging policy table are stored in the charging policy storage unit 17*b* (see FIG. 1) and arranged herein as shown in FIG. 8. For example, when an application is an electronic mail (E-MAIL), a beneficiary is decided to be a sender, causing a branch on the sending side to be charged. When an application is a web browser (WWW) of the Internet, a beneficiary is decided to be a receiver, causing a branch on the receiving side to be charged. When an application is transmission (FTP) for text data or image data, a beneficiary is decided to be a receiver, causing a branch on the receiving side to be charged.

Figure 7:
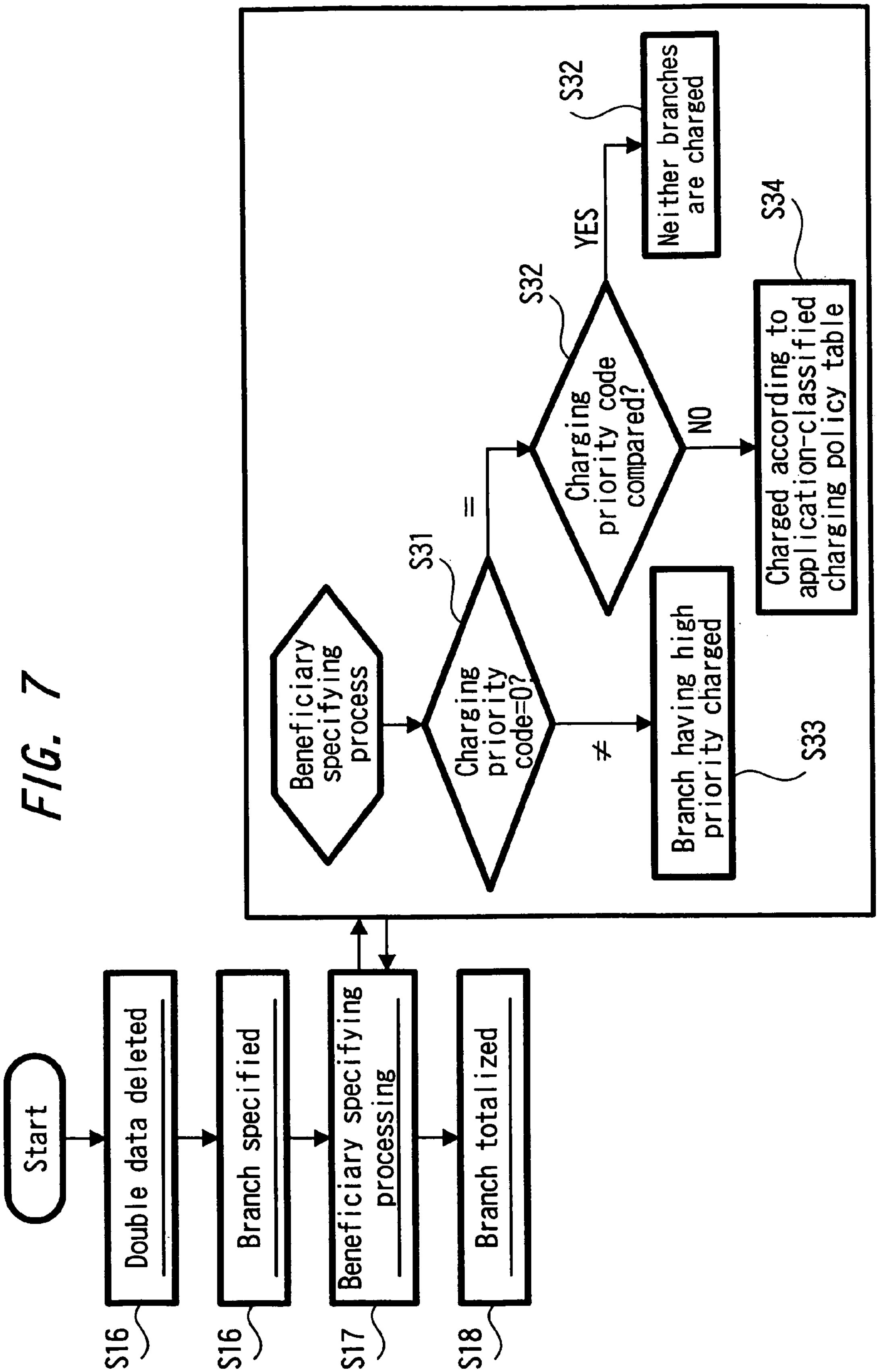
FIG. 7 is a flow chart showing a way of specifying of a beneficiary according to an embodiment of the present invention.

When the processeings shown in the flow chart of FIG. 7 are performed, charging for transmitted data is fairly executed to beneficiaries of the data transmission. Specifically, when various data such as text data and image data are transmitted by request of the receiver, or web browsing of the Internet is performed by the receiver's request, a branch to which a terminal station on the receiving side obtaining the data belongs is charged. For electronic mail data being data transmitted by the sender's request, a branch to which a terminal station on the sending side belongs is charged. This ensures the charging to be kept fair. In the network system of this embodiment, an object to be charged is limited to a domestic branch, and charged objects related to data sent from a branch except for the charged branches connected through the network are specified to domestic receiving branches.

Figure 9:
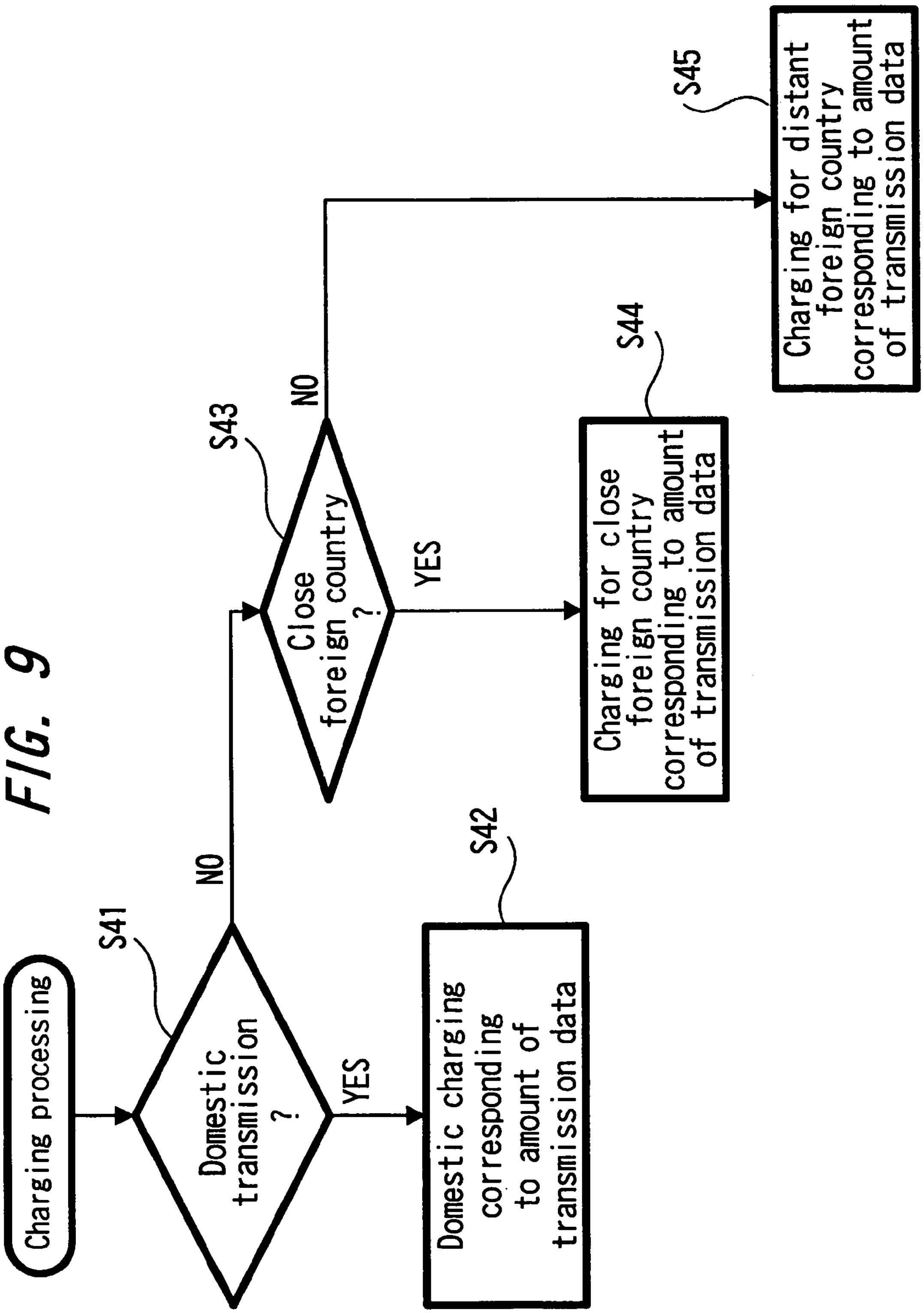
FIG. 9 is a flow chart showing a charging unit cost setting processing according to an embodiment of the present invention.

A branch to be charged for each data transmission can be decided on the basis of the above processesings. However, the configuration of this embodiment is arranged so that an amount of data transmission and its transmission distance are further estimated to decide a charged amount of money. FIG. 9 is a flow chart showing processings performed in this case. First of all, it is checked whether a data transmission takes place between domestic networks or not (step S41). If it is determined that the data transmission takes place between domestic networks, an amount of data transmission at that time is multiplied by a data transmission unit cost which is preset for domestic transmission to calculate the amount of charging (step S42). As to the data transmission unit cost used herein, a setting as, yen per 1-Mbyte transmission is provided.

If it is determined at step S41 that the data transmission is not performed between domestic networks, it is checked whether the data transmission is performed with a close foreign country or not (step S43). The close foreign country means herein, for example, Asian countries. If it is determined that the data transmission is performed with a close foreign country, an amount of data transmission performed at that time is multiplied by a data transmission unit cost preset for transmission with a close foreign country to calculate the amount of charging (step S44). This unit cost is set at an amount higher than a domestic data transmission unit cost.

Furthermore, if it is determined at step S43 that the data transmission is not performed with a close foreign country, an amount of data transmission performed at that time is multiplied by a data transmission unit cost preset for transmission with a distant foreign country to calculate the amount of charging (step S45). This unit cost is set at an amount higher than the unit cost of a data transmission with close foreign countries.

According to the system configuration of this embodiment described above, an sending side or an receiving side to be charged for each data transmission is decided for every type of data, and a branch to be charged is decided on the basis of an IP address on the decided side. Moreover, an amount of data transmission is multiplied by a unit cost set depending on a distance of data transmission to determine the charged amount of each branch. Thus, fair calculation of the charged amount is performed based on a state using a TCP/IP communication network in a terminal station within each branch.

In this embodiment, it is designated that the measurement of the traffic in the traffic measurement device arranged in each LAN is performed by sampling. Due to this design, an amount of data used when the measured traffic data are transmitted to the collecting device on the center side can be considerably reduced. Therefore, the line capacity of the network need not be increased to transmit data for charging, thereby allowing the a charging system to be constructed at low costs. In addition, an amount of data used for summing up can be reduced accordingly and an amount of data when processing to totalize in the collecting device also decreases. Equipments such as a traffic measurement device (collecting section) arranged on the center side can be constituted by a low-cost device having a smaller data throughput. When traffic data is measured by sampling, a communication fee which is charged on each branch may be different from a fee which is charged by measuring all actual data transmission states. When charging is performed for data transmission between enterprises to which such network system is applied, the difference between the amounts falls within a range which is negligible as an error.

Since the measurement of data transmission state in the network is not performed on a WAN line side being wide area network which connects positions to each other, but is performed by the traffic measurement device connected to a LAN on a terminal side, the satisfactory measurement can be performed. Specifically, a communication line constituting the WAN line must be probably changed into a line having a larger capacity at any time when an amount of data transmission in the network increases. If a traffic is measured on the WAN line side, the traffic measurement device must be changed accordingly each time the configuration of the communication line changes, and the charging system itself also must be changed as need arises. In contrast, the LAN line is not so often changed in capacity. Thus, the traffic measurement device may be less probably changed and can measure a traffic for charging stably in a fixed system.

Furthermore, a data transmission route on the WAN line side is selected by a router depending on according to the line state at that time. Therefore, even if data transmission between two specific points is performed a plurality of times, the same route is not always selected. When a traffic is thus measured on the WAN line side, the measurement is not always performed under definite conditions. However, when a traffic is measured on the LAN side as in this embodiment, even if transmission is performed via any route on the WAN line side, the traffic measurement device of the LAN having a sending station and the traffic measurement device of the LAN having a receiving station are not changed. For this reason, even the sampling measurement can be performed with high accuracy.

Moreover, when the traffic is measured by the traffic measurement device on the LAN side as in this embodiment, the traffic is doubly measured by the traffic measurement device of the a LAN having a sending station and the traffic measurement device of the LAN having a receiving station. Even if the traffic cannot be measured by any one of the traffic measurement devices for any reason, the transmission state can be seen from the traffic data measured by the other traffic measurement device, thus providing high reliability of a measurement for charging and preventing an accident which makes charging impossible.

In the embodiment described above, the configuration of the TCP/IP communication network is shown in FIG. 1, for simple description, in which a relatively small number of LAN segments are connected to each other through the WAN lines. However, the present invention is not limited to such a network configuration and is also applicable to a network configuration in which a larger number of LANs and WANs are connected to each other, as a matter of course. Although the specific configuration of communication line forming the LAN or WAN has not especially been described in the above embodiment, various wired or wireless communication lines applicable to this kind of communication network can be applied.

The decision of type of data transmission which is a premise of charging or the decision of transmission distance, and the like may be performed in more detail than those in the above embodiment for charging. For example, in the above embodiment, decisions of a transmission distance on charging are classified into three stages of a domestic stage, a close foreign stage, and a distant foreign stage. However, the domestic transmission unit cost may set in a plurality of stages depending on the data transmission distance. Moreover, in the above embodiment, a unit cost is simply multiplied by an amount of data transmission to calculate an amount of charging. However, such processing in which the unit cost of charging is decreased as total amount of data transmission increases may be performed. In addition, the unit cost may be changed depending on the kind of transmitted data.

According to the communication network specific charging method described in claim 1, the charging operation can be executed to a user who uses a sub-network on the basis of the transmission state of the network. By the sampling measurement on the local area network side, the data transmission state can be decided to perform the a charging processing. The data of transmission state transmitted through the on a communication network is only data measured by sampling. Thus, by transmitting when only a small amount of data, the amount of charging each sub-network can be decided without fail on the center side. Since the measurement of data transmission state at each position is performed on the local area network side connected to the position, the measurement in the line of the wide area network connecting positions to each other need not be performed, thereby aboiding inconvenience occurring when lines for the wide area network are measured.

According to the communication network specific charging method described in claim 2, in the invention described in claim 1, an amount of data transmission of each sub-network is decided from the transmission state data transmitted to the center, and charging depending on the amount of transmission is performed, so that correct charging such as charging which is proportional to the amount of data transmission is enabled.

According to the communication network specific charging method described in claim 3, in the invention described in claim 1, any one of the transmission state data on the sending side and the transmission state data on the receiving side for transmission data between two predetermined sub-networks is deleted from the transmission state data transmitted to the center, and the decision for charging is performed on the basis of the remaining transmission state data, so that double charging caused by the same data transmitted through the communication network can be avoided. In addition, even though a case where the a transmission state cannot be measured in the local area network of any one of sub-networks occurs, if the transmission states can be measured on a sub-network side of a communication partner, the transmission state data can be correctly totalized. As a result, the reliability of charging process is improved.

According to the communication network specific charging method described in claim 4, in the invention described in claim 1, charging order of enterprises who use sub-networks is decided, so that the obligor can be determined based on the decision. In this manner, a flexible charging policy for an enterprise who must be charged regardless of sender or receiver and an enterprise who is not charged can be determined.

According to the communication network specific charging method described in claim 5, in the invention described in claim 1, charging is enabled using an application which can be easily understood by a user without using a communication protocol such as TCP/IP protocol, and convenience of the user can be improved, and also a manager can manage a plurality of protocols collectively. This makes it possible to reduce the number of managing steps.

According to the communication network specific charging method described in claim 6, in the invention described in claim 5, the type of application of transmission data is decided, and charging to a sub-network on the sending side and charging to a sub-network on the receiving side are discriminated from each other on the basis of the decision, so that charging according to the beneficiary charged principle can be performed on the basis of the type of application of transmission data.

According to the communication network specific charging method described in claim 7, in the invention described in claim 5, as concerns data transmission performed through another communication network connected to the relevant communication network, a sub-network on a sending side or a receiving side existing in the relevant communication network is charged. Thus, objects to be charged are limited to those within the communication network, so that appropriate charging can be performed.

According to the communication network specific charging method described in claim 8, in the invention described in claim 5, to discriminate charging to a sub-network on a sending side from charging to a sub-network on a receiving side, the charging priority code is set for each sub-network and a sub-network which is always excepted from objects to be charged is set regardless of the kinds of applications and the difference between the sender and the receiver, so that such a setting can easily be performed that a specific sub-network is not charged.

According to the communication network specific charging method described in claim 9, in the invention described in claim 5, a sub-network having a charging priority code of a larger value is charged, and, when the charging priority codes have equal values, the obligor is determined according to preset a charging policy for each application, so that appropriate charging can be performed for each application on that occasion only when the charging priority codes assigned to the sub-networks have equal values.

According to the communication network specific charging apparatus described in claim 10, the data transmission state in each sub-network is decided on the basis of sampled data of the traffic transmitted from traffic measurement means connected in a communication network, for charging on to respective sub-network users, so that appropriate charging based on the sampled data of the traffic can be performed.

According to the communication network specific charging apparatus described in claim 11, in the invention described in claim 10, the charging processing means decides contents of data and an amount of transmission of each sub-network and produces charging data corresponding to the decided amount of data transmission, so that appropriate charging depending on the amount of transmission is enabled.

According to the communication network specific charging apparatus described in claim 12, in the invention described in claim 10, when a plurality of transmission data between two sub-networks exist, any one of the transmission state data transmitted to the receiving means is employed to decide for charging on the basis of that transmission state data, so that double charging caused by the same data transmitted through the communication network can be avoided. Moreover, even if a case where sampled traffic data from any sub-network is not transmitted occurs, the transmission state data are correctly totalized on the basis of the sampled traffic data from a sub-network side on the partner side performing communication, so that the reliability of charging processing is improved.

According to the communication network specific charging apparatus described in claim 13, in the invention described in claim 10, the charging processing means discriminates between charging to a user of a sub-network on a sending side and charging to a user of a sub-network on a receiving side on the basis of predetermined charging priorities of sub-networks, and it also manages protocols having the same using purpose of the transmission states collecting into a certain application, decides the types of applications of the transmission data from the transmission state data, and discriminates between charging to a user of a sub-network on the sending side and charging to a user of a sub-network on the receiving side on the basis the decision of the type. As a result, charging according to the beneficiary charged principle can be performed on the basis of the type of the application of the transmission data.

According to the communication network specific charging apparatus described in claim 14, in the invention described in claim 10, the charging processing means can charge using a charging priority code set for each sub-network based on a predetermined priority order of users of sub-networks for determining which is the obligor a user of a sub-network on the sending side or a user of a sub-network on the receiving side.

According to the communication network specific charging apparatus described in claim 15, in the invention described in claim 14, when in the charging processing means decides, an obligor a sub-network having a charging priority code of a larger value is charged, and, if the charging priority codes have equal values, the obligor is determined according to a preset charging policy for each application, so that the obligor can be determined simply and satisfactorily.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication network specific charging method for data transmission in a communication network in which a plurality of positions are connected to each other through a wide area network, sub-networks are connected to the respective positions through local area networks, and sending of data from terminal stations in the sub-networks or receiving of data in the terminal stations is performed, the method comprising the steps of:

performing intermittent sampling measurements, in the local area networks connected to the respective positions, of transmission states of data sent from the local area networks and transmission states of data received in the local area networks;

periodically transmitting data of the transmission states subjected to the sampling measurements to a predetermined center connected to the communication network; and deciding an amount of money to be charged to each user who uses the respective sub-networks on the basis of the data of the transmission states transmitted to the center, wherein protocols having the same using purpose of the transmission states are collected into a certain application for management, and the types of applications of the transmission data are decided from the data of the transmission states, to discriminate charging to a sub-network on the sending side from charging to a sub-network on the receiving side on the basis of the decision.

2. A communication network specific charging method according to claim 1, wherein it is arranged beforehand in each application which of the sending side and the receiving side is a beneficiary, and a user of a sub-network on the side which is defined as the beneficiary in the arrangement is charged.

3. A communication network specific charging method according to claim 1, wherein regarding data transmission performed through another communication network connected to the communication network, a user of a sub-network on the sending side or on the receiving side existing in the communication network is charged.

4. A communication network specific charging method according to claim 1, wherein for discrimination of charging to a sub-network user on the sending side from charging to a sub-network user on the receiving side, a charging priority code is set for each sub-network, and such a sub-network that is always excepted from an object to be charged is set regardless of the type of application and the difference between the sender and the receiver.

5. A communication network specific charging method according to claim 4, wherein the user of the sub-network having a larger value of the charging priority code is charged, and, when the charging priority codes have equal values, an obligor is determined according to a predetermined charging policy for applications.

6. A communication network specific charging apparatus for performing a charging processing for data transmission in a communication network in which a plurality of positions are connected to each other through a wide area network, sub-networks are connected to the respective positions through local area networks, and sending of data from terminal stations in the sub-networks or receiving of data in the terminal stations is performed, the apparatus comprising:

receiving means which is connected to a predetermined position of the communication network and which receives intermittently sampled traffic data collected from traffic measurement means connected to the local area networks; and charging processing means which decides a data transmission state in the communication network on the basis of the intermittently sampled traffic data received by the receiving means and which generates charging data for charging to users who use the respective sub-networks on the sending side or the receiving side of the data on the basis of the decided transmission state, wherein the charging processing means performs discrimination of charging to a sub-network user on the sending side from charging to a sub-network user on the receiving side on the basis of predetermined charging priorities of the sub-networks, and protocols of the same using purpose of the transmission states are collected into a certain application for management, and the types of applications of the transmission data are decided from the data of the transmission states, to discriminate charging to a sub-network user on the sending side from charging to a sub-network user on the receiving side on the basis of the decision.

* * * * *